United States Patent Office 3,841,956
Patented Oct. 15, 1974

3,841,956
BONDED WEATHER RESISTANT DECORATIVE LAMINATE WITH SLIGHTLY GRAINED ACRYLIC SURFACE
Salvatore E. Palazzolo, Hampton, S.C., and Richard R. Hetrick, Bainbridge, N.Y., assignors to Westinghouse Electric Corporation, Pittsburgh, Pa.
Continuation-in-part of application Ser. No. 94,848, Dec. 3, 1970. This application Oct. 24, 1972, Ser. No. 300,006
Int. Cl. B32b 27/42; C09j 5/02
U.S. Cl. 161—248                    9 Claims

ABSTRACT OF THE DISCLOSURE

A weatherproof outdoor laminate is made from a core layer impregnated with a phenolic resin, a print sheet layer impregnated with an aminotriazine-aldehyde resin and an outer protective layer of methyl methacrylate consisting of polymers having a molecular weight from about 320,000 to 550,000, wherein the outer layer has a surface effective to allow gas bleedability that is bonded directly to the print sheet layer without the use of a separate adhesive layer.

CROSS REFERENCE TO RELATED APPLICATIONS

This application is a continuation-in-part application of application U.S. Ser. No. 94,848, now abandoned filed on Dec. 3, 1970.

BACKGROUND OF THE INVENTION

This invention relates to low cost, weatherproof, outdoor decorative laminates. More particularly, this invention relates to outdoor laminates of a phenolic impregnated core layer protected by an outer poly (methyl methacrylate) layer consisting of high molecular weight polymers, which is bonded directly to the body of the laminate without the use of a separate adhesive layer.

Acrylic films were marketed in 1967. These films exhibited high resistance to the effects of ultraviolet radiation, good retention of flexibility of exterior aging, and outstanding resistance to yellowing under both heat and light exposure. The film was suggested for press lamination without adhesive to wood veneer, paper and plastic substrates.

The advantages of laminate protective overlay sheets of homopolymers and modified copolymers of methyl methacrylate, having low molecular weight, was also recognized by Pounds in U.S. Pat. No. 3,345,248 and Petropoulos in U.S. Pat. No. 3,220,916. Pounds and Petropoulos taught replacing an aminotriazine-aldehyde sheet, as a protective overlay for a melamine-formaldehyde resin impregnated decorative sheet in an outdoor laminate, with a sheet of methyl methacrylate consisting of polymers having an average molecular weight ($\overline{M}_v$) from about 60,000 to 250,000.

Pounds and Petropoulos taught however that preformed film sheets of methyl methacrylate consisting of polymers having average molecular weight ($\overline{M}_v$) over 250,000 could not be bonded to the melamine-formaldehyde resin impregnated decorative sheet of laminates having phenolic resin impregnated core members, without using temperatures and pressures harmful to the laminate. Such laminate protective sheets of higher molecular weight polymers would however be advantageous, and extremely useful, due to greater resistance to chemical and other environmental attack, particularly solvent resistance, and the use of pre-formed film sheets would allow commercial manufacture of this type outdoor laminate.

There is a need, therefore, for new and improved acrylic protective coatings for laminates. This need encompasses a need for new methods of fabricating acrylic protective coated laminates having thinner and less expensive protective coatings of high molecular weight polymers.

SUMMARY OF THE INVENTION

We have found the poly (methyl methacrylate) sheet, comprising polymers having an average molecular weight ($\overline{M}_v$) of between about 320,000 and 550,000 and having a gas bleed off surface finish, can be laminated, without auxiliary adhesive, to a decorative sheet of paper impregnated with a melamine-formaldehyde resin supported by a plurality of phenolic resin impregnated core sheets. The final bond is developed under the influence of about 1200 p.s.i. and 290° F. in a press. The product has strong bond adhesion which resists weakening or delamination under testing and is useful as a superior outdoor laminate.

BRIEF DESCRIPTION OF THE DRAWINGS

For a better understanding of the invention, reference may be made to the preferred embodiments, exemplary of the invention, shown in the accompanying drawings in which.

DESCRIPTION OF THE PREFERRED EMBODIMENTS

Figure 1:
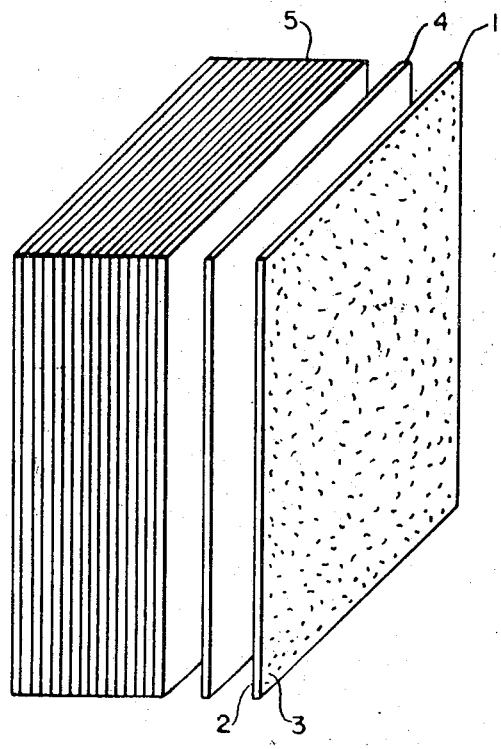
FIG. 1 shows an exploded three dimensional view of one embodiment of the laminate of this invention.
Figure 2:
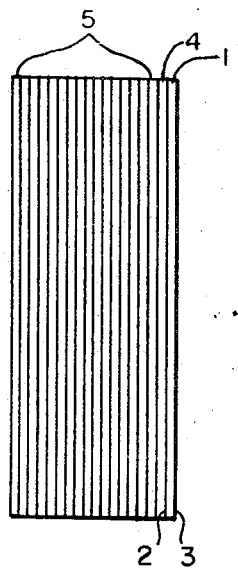
FIG. 2 shows a cross section of the laminate in consolidated form.

The protective outer layer used in this invention is based on poly (methyl methacrylate) sheet prepared from polymers having average molecular weights ($\overline{M}_v$) substantially above 250,000. This film is commercially available under the tradename Korad C in thicknesses from 2 to 6 mils.

Acrylic plastics are made by free radical catalysts acting on monomeric methyl methacrylate. They are rigid thermoplastics made from upwards of 90 percent methyl methacrylate, the remainder being an ester of acrylic or methacrylic acid. Most molding compositions are copolymers of methyl methacrylate with 1 to 12 percent of ethyl acrylate as a modifier to provide increased flow in molding.

The all-acrylic resins range from soft gums such as polymers of ethyl acrylate or octyl methacrylate through flexible materials such as polybutyl methacrylate to rigid polymethyl methacrylate. By co-polymerization of various acrylic monomers, an essentially continuous range of softness and solubility is obtainable.

Casting and extrusion are the two basic methods of producing acrylic sheet. In extrusion, the sheet is produced from solid acrylic polymers by a melt process through a die. In casting, the sheet is produced from catalyzed monomer or a syrup of partially polymerized monomer which may be poured into cells made from two sheets of glass with a compressible gasket around the edge. The stock is cured in ovens or a water bath, usually followed by further heating at about 220° F. to complete the polymerization and eliminate shrinkage strains. To increase melt flow in thermoforming, up to about 10 percent by weight of a plasticizer such as dioctyl phthalate, dibutyl phthalate, polyethylene glycols or alkyl acrylates such as ethyl acrylate may be incorporated in the monomer. The acrylic sheet may also be continuously cast where the chemical reaction of the blend of monomer and catalyst is controlled to result in rapid cure.

The acrylic plastic sheet used in this invention consists of high molecular weight methyl methacrylate homopolymers with a small amount of low molecular weight plasticizer. Its number average molecular weight ($\overline{M}_n$) is approximately 308,000 and its weight average molecular weight ($\overline{M}_w$) is approximately 654,000 with a polydispersity ratio ($\overline{M}_w/\overline{M}_n$) of 2.13. The average molecular weight of the nonmodified poly (methyl methacrylate) plastic sheet used in this invention based on intrinsic viscostiy measurements ($\overline{M}_v$) is between the $\overline{M}_n$ and $\overline{M}_w$ values of 308,000 and 654,000 and more specifically between about 320,000 and 550,000.

The flexible thin-gauge pre-formed acrylic plastic sheet used in this invention ranges in thickness from about 1 to 10 mils and has a mat or slightly grained, roughened surface finish before bonding on at least one side. This nonsmooth finish can permit air to bleed off between the sheet and the polished press plate and more importantly between the sheet and the substrate during lamination. While it is necessary to have the gas bleedable finish contacting the laminate assembly it is not necessary to have it contacting the press plate. It is believed that the nonsmooth finish substantially contributes to bondability without destruction of the laminate. It is believed that the nonsmooth finish also allows gaseous steam condensation products of phenol or melamine formaldehyde to bleed off between the sheet and the substrate during lamination. Such surfaces, effective to permit gas bleed off during bonding, whether grained, roughened, scored or embossed, would appear to become more important as larger commercial type laminate sizes, i.e. above about 2' x 2' are approached, due to the long gas diffusion escape path from the center of the sheet to the edge during bonding.

Referring now to FIG. 1, the pre-formed high molecular weight poly (methyl methacrylate) protective sheet 1 used in this invention is shown with gas bleedable surfaces 2 and 3 on each side of the sheet. These surfaces are shown as grained but may be cross hatched, ribbed, or tread scribed, in order to allow gas bleed off during bonding to the assembly.

The print sheet layer shown as a 4 in the drawings is disposed between the core and protective layer and usually provides the decorative effect for the laminate. It is usually in the form of a decorative sheet, i.e. dyed, pigmented to impart a solid color, or printed with an ornamental design such as wood or marble grain. It usually comprises a single sheet of high grade absorbent alpha-cellulose or regenerated cellulose paper impregnated with a substantially cured, fusible or B-staged, aminotriazine-aldehyde resin, usually a thermosettable melamine-formaldehyde resin. Other useful print sheet materials are kraft paper, synthetic fiber paper, cotton, linen and glass fiber fabrics and the like.

The rigidity-imparting core layer 5 usually comprises a plurality of sheet of kraft paper impregnated with phenolic resin.

Melamine is the preferred aminotriazine reactant for preparing the aminotriazine-alehyde resin used to impregnate the print sheet. Melamine (1,2,5 triamino-2,6,6-triazine or cyanouramine) can be prepared by heating urea in the presence of ammonia at temperatures of 250 to 350° C.

Melamine can also be produced from dicyandiamide which is obtained by polymerization of cyanamide at elevated temperatures. The melamine is reacted with an aldehyde such as formaldehyde to yield a potentially thermoset resinous condensate capable of being converted under heat and pressure to a substantially insoluble and infusible form (see U.S. Pat. 2,197,357 and Brydson, *Plastics Materials*, D. Van Nostrand, 1966 "Melamine-Formaldehyde Resins," pp. 418–427).

The mol ratio of aldehyde to aminotriazine in the resinous reaction product may be within the order of from about 1:1 to about 6:1 respectively. Conventional reaction conditions are observed in preparing the resin. Formaldehyde and water are charged and the pH adjusted to 7.5–9 with sodium hydroxide solution. The melamine is then added and the batch heated to reflux at about 210° F. and about 8–10 p.s.i. steam pressure. If desired, the thermosetting aminotriazine-aldehyde resin may be modified by the addition of plasticizers or curing catalysts. Other aminotriazines, e.g. mono-, di- and tri-methylmelamines, and the like; guanamines, such as formoguanamine, acetoguanamine, benzoguanamine, and the like, as well as mixtures of aminotriazines, may also be utilized as reactants. Similarly, formaldehyde, either as such or as an aqueous solution, is the preferred aldehyde reactant, but other aldehydes, e.g. acetaldehyde, propionaldehyde, butyraldehyde, benzaldehyde, dialdehydes and the like, or compounds engendering aldehydes, e.g., paraformaldehyde, hexamethylene-tetramine, and the like, may also be employed. Such aminotriazine-aldehyde resins are well known in the art and reference may be made to U.S. Patent 3,392,082 for exhaustive details on their production.

The thermosetting phenolic resins used to impregnate the plurality of core sheets are well known in the art (see U.S. Pats. 2,205,427; 2,315,087; 2,328,592 and 2,383,430 and Brydson *Plastic Materials*, D. Van Nostrand, 1966, Chapter 19). They are conventionally obtained by reacting a phenolic substance such as phenol itself, substituted phenols, e.g., alkyl phenols such as cresols, xylenols, tertiary alkyl phenols, and the like, or mixtures of such phenolic substances with an aldehyde such as formaldehyde, acetaldehyde, propionaldehyde, benzaldehyde, furfural, and the like, or with mixture of such aldehydes, either alone or in the presence of other aldehyde-reactable substances such as urea, thiourea, substituted ureas and thioureas, aminotriazines, e.g., melamine, lignin derivatives, and the like.

The print sheet and core sheets are impregnated using standard techniques. The print sheet will be impregnated with a solution of aminotriazine-aldehyde resin to give a resin content between 30% and 95% by weight, based on the total dry weight of the impregnated sheet and then dried to a stage where the volatile content is between 2% and 10%. The core layer sheets are impregnated with a solution of phenolic resin to give a resin content between 25% and 40% by weight, based on the total dry weight of the impregnated sheet, and then dried to a stage at which the resin is only partly cured and has a volatile content between 4% and 15%.

High pressure laminating techniques are employed in preparing laminates from the above described core layer of core sheets, print sheet layer and top high molecular weight poly (methyl methacrylate) sheet layer. The print sheet layer will generally be a decorative sheet and may carry a pattern. The high molecular weight poly (methyl methacrylate) layer may be transparent or pigmented. In the latter case a subsurface sheet would not be required, the top methacrylate sheet being bonded directly to the corestock without an adhesive.

The high molecular weight poly (methyl methacrylate) top layer is placed against the print sheet layer. No adhesive cement layer is used to bond the two together. Then the top layer and print sheet layer are assembled with the rigidity-imparting core sheets, and inserted in a laminating press between press plates which are generally stainless steel and may have finishes ranging from a mirror polish to a mat surface. The assembly is then consolidated by means of heat and pressure into a unitary decorative structure.

Temperatures ranging from about 250° F. to about 320° F. and pressures ranging from about 1000 p.s.i. to 1500 p.s.i. are employed. The total time required to effect a cure of the resinous components of the assembly will usually be from about 5 minutes to about 45 minutes at the curing temperature. The resulting laminate is generally allowed to cool to about 100° F. before being removed from the press. In certain cases it may be desirable to use a thin release sheet, such as for example a sheet of metal foil or paper coated with a release agent such as calcium stearate, or other means such as a coating of calcium stearate between the protective layer and the press plate of the laminating mold to produce special surface texturing effects.

The invention is illustrated by the following example.

Example I

A roll of 105 lb. kraft paper was treated with a solution of phenol-formaldehyde resin to give a resin content between 31% and 35% and then dried to a stage at which the resin was only partly cured and had a volatile content between 6% and 9%. Equal size impregnated core sheets, 12" x 18", were cut from the roll and assembled in a stack of 7 sheets to form a core layer. A white pigmented phenol-formaldehyde impregnated core sheet was placed on the stack to provide a subsurface sheet. A layer comprising a 12" x 18" print sheet of white pigmented alpha-cellulose paper was impregnated with melamine-formaldehyde resin and superimposed on the subsurface sheet followed by a 12" x 18" clear, pre-formed high molecular weight poly (methyl methacrylate) film sheet 2.0 mil thick, having a mat or slightly grained, roughened surface finish on both sides. The acrylic sheet had a molecular weight ($\overline{M}_v$) between about 320,000–550,000, a specific gravity (ASTM D–792–64T based on $H_2O$ at 23° C.) of 1.17, a water absorption rate (ASTM D–570–63 based on 24 hrs. at 23° C.) of 0.7 percent and a water vapor transmission rate (ASTM E–96–63T) of 10 gr./24 hrs./100 in.$^2$ under the tradename Korad C.

The melamine-formaldehyde resin content of the print sheet prior to drying was between 41% and 43% and after curing it had a volatile content between 3.5% and 5.0%. No adhesive cement layer was used between the high molecular weight poly (methyl methacrylate) protective film and the print sheet surface.

The assembly was placed in a press and molded against a chrome polished steel pressing plate at 1200 p.s.i. with a platen temperature of 315° F. The controlled internal temperature was 4 minutes above 270° F. with a maximum temperature of 290° F. The assembly was heated in the press for a total of about 30 minutes. About 20 minutes was required for warm-up after placing the laminate in the press.

The laminate was allowed to cool for about 5 minutes and then the durability of the high molecular weight poly (methyl methacrylate) bond to the laminate substrate was tested by the National Electrical Manufacturers Association (NEMA Test ID1–2.07), Test for Immersion in Boiling Water. After two hours boiling by this test, the specimen was examined for evidence of delamination. The boiled specimen showed no sign of a weakened bond, either in the wet condition or after drying out.

The laminate was also tested in an Atlas Weather-Ometer according to ASTM standards E42–65 and D1499–64. This device rotates the sample so that it is successively exposed to ultraviolet light from a carbon arc and to a spray of distilled water. The carbons are changed after 19–20 hours so that the sample is normally aged about 100 hours per week. R. J. Martinovich and G. R. Hill in a paper presented at the Symposium on the Weatherability of Plastic Materials, Feb. 8 and 9, 1967 at the National Bureau of Standards, Gaithersburg, Maryland, stated that "Weather-Ometer results indicated that 1000–2000 hours exposure is approximately equivalent to 12–24 months in Arizona at 45° South." They also stated that one year exposure in Arizona is roughly equivalent to 2 years in Oklahoma and 3 years in Ohio. Our tests show that the specimen had no serious imperfections, color change, chalking or delaminated areas in the laminate after 2000 hours exposure in the Weather-Ometer.

The melamine formaldehyde impregnating resins were prepared as follows.

To 1620 lbs. (20 moles) of 37% formaldehyde, with a pH adjusted to about 7.5 with sodium hydroxide, was added 1260 lbs. (10 moles) of recrystallized melamine. The slurry pH was adjusted to about 8.2 with 10% sodium hydroxide as needed. The mixture was heated to reflux (98–99° C.) and held at that temperature until a drop or two of the batch when dropped into water at 25° C. formed a cloudy tail as the droplet dispersed throughout the water. At this point the reaction temperature was reduced to about 80° C. and then cooled to 60–65° C. and the following materials added in order, 200 lb. of ethyl alcohol, o,p-toluene sulfonamide and 186 lbs. of methyl glucoside. Mixing was continued to complete solution. Finally 734 lbs. of water were added and the pH adjusted to about 9.1 to produce a composition suitable for saturating the print paper.

To 940 lbs. (10 moles) of molten phenol were added 1012 lbs. (12.5 moles) of 37% formaldehyde solution. To this was added a sodium hydroxide solution containing 15 lbs. (0.375 moles) of sodium hydroxide flakes dissolved in 30 lbs. of water. The mixture was reacted at 98° C. reflux and then diluted with methyl alcohol to a solids content of about 41% determined by a standard procedure of heating the specimen of resin for two hours at 170° C. This varnish was used to saturated kraft paper for the core stack of the laminate.

We claim:
1. A unitary, heat and pressure bonded weather resistant decorative laminated article comprising:
    (a) a rigidity imparting core layer comprising a plurality of sheets impregnated with phenolic resin,
    (b) a print sheet layer impregnated with aminotriazine-aldehyde resin bonded to the core layer, and
    (c) a top methyl methacrylate protective sheet layer consisting essentially of methyl methacrylate homopolymers having average molecular weights from about 320,000 to 550,000, said protective sheet being a pre-formed film having a slightly grained surface before bonding, said slightly grained surface being directly bonded to said print sheet layer without the use of a separate adhesive layer, the slightly grained surface being effective to permit gas bleed off between the print sheet and the protective sheet during bonding of the article.

2. The article of claim 1 wherein the phenolic resin is a phenol-formaldehyde resin, the aminotriazine-aldehyde resin is a melamine-formaldehyde resin and the protective layer has a slightly grained surface on both sides.

3. A unitary, heat and pressure bonded weather resistant decorative laminated article comprising:
    (a) a rigidity imparting core layer comprising a plurality of sheets impregnated with phenol-formaldehyde resin,
    (b) a print sheet layer impregnated with melamine-formaldehyde resin bonded to the core layer,
    (c) a top methyl methacrylate protective sheet layer consisting essentially of methyl methacrylate homopolymers having average molecular weights from about 320,000 to 550,000, said protective sheet being a pre-formed film about 1 to 10 mils thick, said protective sheet having a slightly grained surface before bonding effective to permit gas bleed off between the print sheet and the protective sheet during bonding of the article at about 250–320° F. and 1000–1500 p.s.i., said gas bleedable surface being directly bonded to said print sheet layer without the use of a separate adhesive layer.

4. The article of claim 3 wherein the protective layer has a gas bleedable surface on both sides.

5. The article of claim 3 wherein the protective layer contains up to about 10 percent by weight plasticizer.

6. The article of claim 5 wherein the protective layer consists essentially of plasticizer and non-modified methyl methacrylate homopolymers, the article is larger than about 2 ft. long - 2 ft. wide, and the sheets of the core layer and the print sheet layer are paper sheets.

7. A method for producing a unitary, heat and pressure consolidated weather resistant decorative laminated article comprising the steps:
    (a) preparing an assembly, in superimposed relationship of:
        (i) a plurality of thermosetting phenolformaldehyde resin impregnated core sheets, (ii) a melamine-formaldehyde resin impregnated print sheet, (iii) a top methyl methacrylate protective sheet consisting essentially of methyl methacrylate homopolymers having molecular weights from about 320,000 to 550,000, said protective sheet being a pre-formed film about 1 to 10 mils thick having a surface effective to permit gas bleed off during bonding, said gas bleedable surafce contacting the print sheet without a separate adhesive layer therebetween, and (b) heat and pressure consolidating the assembly, between about 250–320° F. and 1000–1500 p.s.i., to a unitary structure.

8. The method of claim 7 wherein the protective layer has a slightly grained surface on both sides.

9. The method of claim 7 wherein the article is above about 2 ft. long x 2 ft. wide.

References Cited

UNITED STATES PATENTS

| | | | |
|---|---|---|---|
| 3,345,248 | 10/1967 | Pounds et al. | 161—413 X |
| 3,676,290 | 7/1972 | Hetrick | 161—248 X |
| 3,736,220 | 5/1973 | Shah | 161—413 X |
| 3,220,916 | 11/1965 | Petropoulos | 161—151 |
| 3,547,769 | 12/1970 | Albrinck | 161—248 |

GEORGE F. LESMES, Primary Examiner

PATRICIA C. IVES, Assistant Examiner

U.S. Cl. X.R.

156—87, 308; 161—251, 413